USOO6434273B1

(12) United States Patent
Gillman et al.

(10) Patent No.: US 6,434,273 B1
(45) Date of Patent: Aug. 13, 2002

(54) METHOD FOR RECONSTRUCTING A BI-LEVEL IMAGE FROM A LOW QUALITY DISCRETE TRANSFORM IMAGE

(75) Inventors: David Gillman, Sunnyvale, CA (US); Mihai Sipitca, Smyrna; Lyman Porter Hurd, Atlanta, both of GA (US)

(73) Assignee: Iterated Systems, Inc., Atlanta, GA (US)

( * ) Notice: Subject to any disclaimer, the term of this patent is extended or adjusted under 35 U.S.C. 154(b) by 0 days.

(21) Appl. No.: 09/606,301

(22) Filed: Jun. 28, 2000

Related U.S. Application Data

(60) Provisional application No. 60/141,531, filed on Jun. 28, 1999.

(51) Int. Cl.[7] ................................................. G06K 9/36
(52) U.S. Cl. ...................................... 382/239; 382/233
(58) Field of Search ................................ 382/239, 233, 382/232, 248, 250, 251, 235, 162, 166, 169; 348/404.1, 403.1; 358/466

(56) References Cited

U.S. PATENT DOCUMENTS

| | | | | | |
|---|---|---|---|---|---|
| 5,001,559 | A | * | 3/1991 | Gonzales et al. | 358/133 |
| 5,121,216 | A | * | 6/1992 | Chen et al. | 358/261.3 |
| 5,359,676 | A | * | 10/1994 | Fan | 382/56 |
| 5,673,340 | A | * | 9/1997 | Kanda | 382/250 |
| 5,699,457 | A | * | 12/1997 | Adar et al. | 382/239 |
| 5,734,755 | A | * | 3/1998 | Ramchandran et al. | 382/250 |
| 5,892,847 | A | * | 4/1999 | Johnson | 382/232 |
| 5,933,538 | A | * | 8/1999 | Fukuda et al. | 382/251 |

FOREIGN PATENT DOCUMENTS

| | | | |
|---|---|---|---|
| EP | 0 626 790 A1 | 5/1994 | .......... H04N/7/133 |
| WO | WO 01/01349 A1 | 4/2001 | |

OTHER PUBLICATIONS

University of North Dakota, Mark D. Schroeder, JPEG Compression Algorithm and Associated Data Structures, University of North Dakota, Dec., 1997, Grand Forks, ND, (web site at http://www.cs.und.edu/~mschroed/jpeg.html), date of capture Sep. 18, 2001, pp. 1–17.

Projection–Based Spatially Adaptive Reconstruction of Block–Transform Compressed Images, Yongyi Yang, Nikolas P. Galatsanos, Member, IEEE, and Aggelos K. Katsaggelos, Senior Member, IEEE, IEEE Transactions on Image Processing, vol. 4, No. 7, Jul. 1995.

International Search Report, PCT/US00/17845, Sep. 12, 2000, European Patent Office.

XP–000911963–Post–Processing Enhancement of Decompressed Images Using Variable Order Bezier Polynomials and Distance Transform, Joceli Mayer et al., IEEE 1068–0314/98.

Reconstruction of Bilevel Images from a Low Quality JPEG, M. Sipitca et al., Proc. SPIE vol. 3974, pp. 35–44, Image and Video Communications and Processing 2000, Bhaskaran Vasudev; T. Russell Hsing; Andrew G. Tescher; Robert L. Stevenson; Eds., 4/00.

* cited by examiner

Primary Examiner—Phuoc Tran
Assistant Examiner—Amir Alavi
(74) Attorney, Agent, or Firm—Morris, Manning & Martin, LLP

(57) ABSTRACT

The image reconstruction method generates higher quality reconstructed images from compression of a bi-level image. The method includes thresholding to force pixels of the starting image to be closer to bi-level to generate a threshold image. The method transforms the threshold image to generate transform coefficients representing the decomposition of the threshold image. The method selectively clamps the transform coefficients into quantization bins defined by compression of the bi-level image. The selective clamping generates modified coefficients corresponding to the higher quality reconstructed image. The method also includes applying an inverse-transform on the modified coefficients to generate higher quality reconstructed image. The starting image and the reconstructed image can be compared to determine the degree of improvement obtained with the method. The method can be repeated iteratively to obtain an image that more closely represents the original image than does the original lower-quality image.

25 Claims, 10 Drawing Sheets

METHOD FOR RECONSTRUCTING A BI-LEVEL IMAGE FROM A LOW QUALITY DISCRETE TRANSFORM IMAGE

CROSS-REFERENCE TO RELATED APPLICATIONS

The following U.S. Patent Application claims priority under 35 U.S.C. §119 based upon the provisional application entitled Method for Reconstructing Bi-Level Images from a Lower quality Discrete Cosine Transform Image with application No. 60/141,531 filed on Jun. 28, 1999 naming Mihai Sipitca, David Gillman, and Lyman Hurd as inventors.

BACKGROUND OF THE INVENTION

1. Technical Field

The invention relates in general to the field of image compression and, more particularly, reconstructing previously compressed black and white images.

2. Description of the Related Art

As the popularity of the Internet continues to grow, an increasing number of individuals make various types of information available over the Internet. This information may include various types of documents with a combination of pictures and text. To provide this information, these individuals may post a compressed version of the original image on a web site on the World Wide Web.

The Joint Photographic Experts Group (JPEG) designed one of the most common methods for compressing images. JPEG is a compression method that uses a Discrete Cosine Transform (DCT). This method effectively compresses photographic images. Though JPEG may be used for photographic images, its design impedes efficient compression of bi-level, or black and white, images.

To save time, some individuals compress documents containing graphics and text using the JPEG method. Alternatively, some individuals choose JPEG compression for a completely textual image because of its availability. Regardless of the reason, using JPEG to compress a bi-level image introduces significant error into the image's compressed representation. Although JPEG compression normally causes loss of some data pertaining to an original image, use of such compression technique on a bi-level image can increase the amount of data loss so significantly that it may render the decompressed image unusable.

Previously, improving the quality of a JPEG-compressed bi-level image in the absence of an original image appeared impractical. As many websites and desktop publishing software utilize JPEG images, there is a need for a method for generating a higher quality image.

SUMMARY OF THE INVENTION

The present invention satisfies the above-mentioned need in a method for generating a higher quality reconstructed image from a lower quality image resulting from JPEG compression of a bi-level image. The invented method comprises thresholding to force pixels of a starting image to be closer to bi-level to generate a threshold image, transforming the threshold image to generate transform coefficients corresponding to a decomposition of the threshold image, selectively clamping the transform coefficients into quantization bins defined by compression of the bi-level image, and applying an inverse-transform on the modified coefficients to generate the higher quality reconstructed image. The starting image and the reconstructed image can be compared to determine the degree of improvement obtained with the method. The method can be repeated iteratively to obtain an image that more closely represents the original image than does the original lower-quality image.

Figure 1:
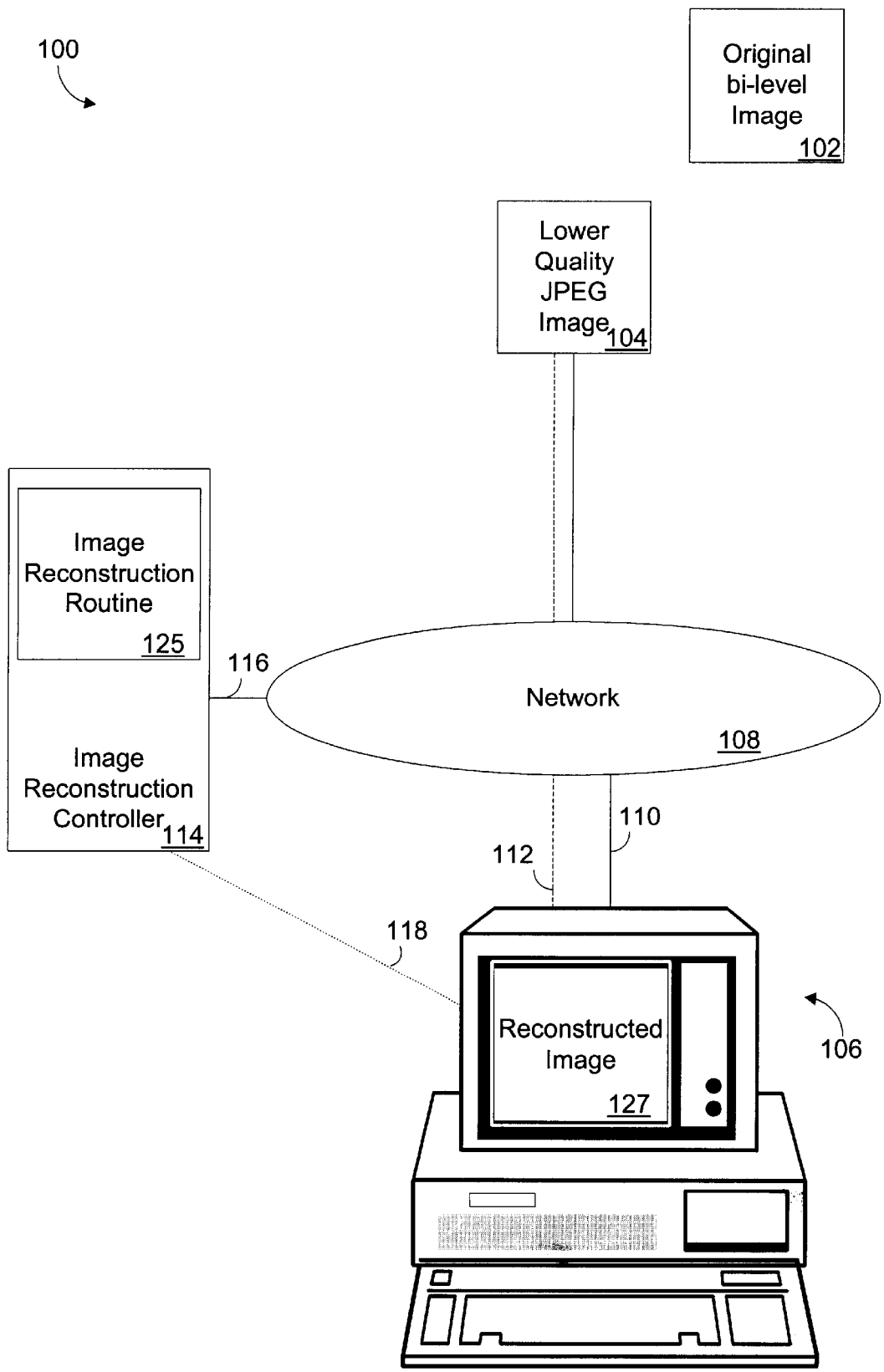
FIG. 1 is a block diagram illustrating an image reconstruction system in accordance with the invention.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF EMBODIMENTS OF THE INVENTION

Illustrative embodiments of the invention are described below as they might be employed in a method for generating a higher quality reconstructed image. In the interest of conciseness, not all features of an actual implementation are described in this specification. It will of course be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

As used herein, the following terms have the following meanings:

'Quality' is a measure of how closely a reconstructed image matches an original bi-level image from which the image is derived. Quality can be determined by comparing intensity value of respective pixels of the original bi-level image and a reconstructed image. To say that a reconstructed image has higher quality than a starting image means that the reconstructed image more closely represents the bi-level image in terms of its pixel intensity values than does the starting image. A 'lower quality' image has pixel intensities less similar to a bi-level image than a 'higher quality' image.

'Reconstructed image' is the image that results from one or more iterations of the invented method starting with an original lower quality image.

'Starting image' refers to an image to which the invented method is applied to derive a reconstructed image. The 'starting image' can be an original lower quality image to which the invented method is to be applied. The 'starting image' can also be a reconstructed image resulting from one or more iterations of the method, that is to be subjected to another iteration of the method.

1. Overview

The present invention is typically embodied in software that generates a higher quality reconstructed image from a starting image using a compression technique designed by the Joint Photographic Experts Group, commonly referred to as JPEG. While reconstruction of a single JPEG image is described, the present invention is equally applicable to other transform-based compression methods and multiple images.

FIG. 1 is a block diagram illustrating an image reconstruction system 100. The compression of an original bi-level image 102 through a transform such as JPEG produces a lower quality JPEG image 104. The disclosed system and method operate on the lower quality JPEG image 104 to produce an image closer to the original bi-level image 102. An end-user with a computer system 106 may acquire the lower quality JPEG image 104 by downloading it from a network 108 as indicated by the line 110. The network 108 can be any type of network, such as the "Internet" or World Wide Web; a wide area network (WAN), a local area network (LAN), or a combination of such networks, for example. Although the end-user may download this JPEG image 104, such end-user may alternatively acquire it through simple file transfer using a floppy disk. If file transfer is used, the JPEG image 104 is supplied directly to the computer system 106 as indicated by line 112. Once the JPEG image 104 is on the computer system 106, the end-user may realize that the poor image quality makes using it difficult. For example, this image may contain smudging that impairs readability.

As previously stated, the JPEG image 104 originated from compression of the bi-level image 102. In the absence of this original image 102, the end-user may improve the quality of the JPEG image 104 by using an image reconstruction controller 114. Typically, the image reconstruction controller 114 resides within a piece of software and manages the reconstruction process. It may connect to the network 108 via line 116. To access the image reconstruction controller 114, an end-user may "run" this software either locally as indicated by line 118 or remotely as indicated by line 110. Within this controller 114, an image reconstruction routine 125 executes the algorithm that controls the process of reconstructing the JPEG image 104. After running the image reconstruction software, an end-user possesses a reconstructed image 127 of higher quality than the lower quality JPEG image 104. Thus, the image reconstruction system 100 provides the end-user with a reconstructed image of higher quality than the starting image.

2. Detailed Description of Specific Embodiments

Figure 2:
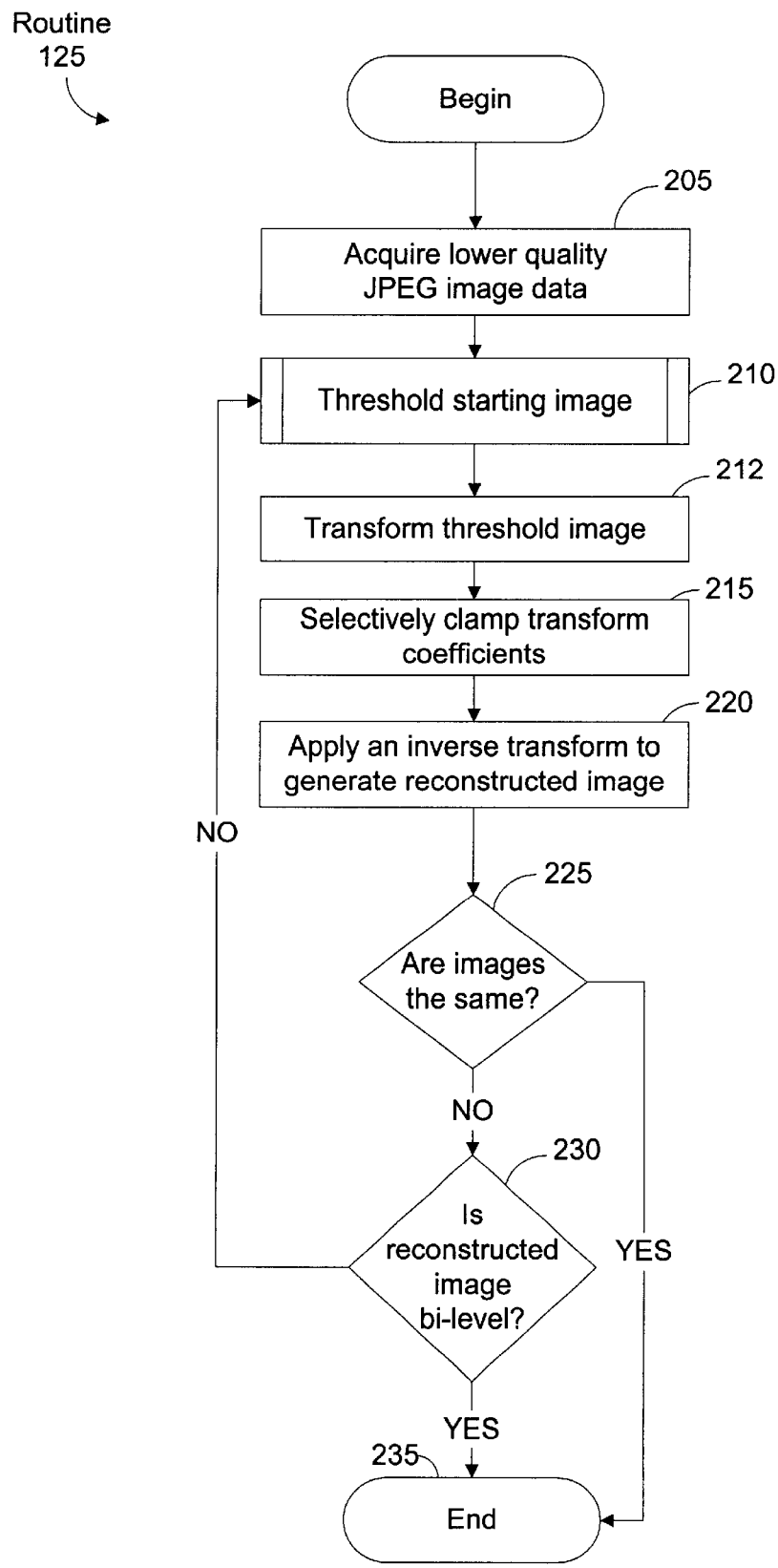
FIG. 2 is a logic flow diagram illustrating the operation of an image reconstruction routine that can be performed by the system shown in FIG. 1.

FIG. 2 is a logic flow diagram illustrating the operation of the image reconstruction routine 125. In step 205, the image reconstruction routine 125 acquires image data of the lower quality image 104. Typically, an image is divided into picture elements ("pixels") that represent a single point in a graphic image. In a digital image, each picture element has an associated intensity. In a bi-level image, these values are constrained to one of two values usually interpreted as black and white. These picture elements, or pixels, may be grouped together in independent blocks of 8×8 pixels. Because of the design of the image reconstruction routine 125, it can simultaneously process multiple 8×8 blocks of pixels. Typically, this routine processes one block through one iteration before proceeding to the next block, and so on, to process the entire image.

During JPEG compression of the original bi-level image 102, a mathematical transform, such as a DCT transform, is applied to each 8×8 block of pixels in this image. Since a DCT transform would be well known to one skilled in JPEG compression technology, some of the details regarding this transform method have been omitted. Generally, the DCT transform is a linear transform applied to the pixels in an 8×8 block of an image. This transformation generates sixty-four independent DCT coefficients for each of the 8×8 blocks of the bi-level image 102. These coefficients represent to the decomposition of the image.

To aid in storage, the accuracy of the DCT coefficients for the bi-level image 102 may be reduced by quantization. For the sake of brevity, the details surrounding quantization have also been omitted. Generally, quantization in JPEG compression produces quantized coefficients by scaling the DCT coefficients and rounding them to an integer. The scaling may be described by a quantization factor. Each of the DCT coefficients for each of the 8×8 blocks of the bi-level image 102 is scaled by a corresponding quantization factor. After these coefficients are quantized, they may be encoded and stored as data in a JPEG file. Typically, a JPEG image is divided into luminance and chrominance data and the quantization factors for each of the 8×8 blocks of the bi-level image 102 related to luminance and chrominance are constant for all blocks of the given type. Hence, the quantization factors of the bi-level image 102 may be encoded and then stored in the header of the JPEG file as luminance and chrominance "look up" tables.

Typically, the image reconstruction routine 125 acquires the image data in step 205 for the lower quality image 104 as the previously described JPEG data file. By acquiring the JPEG data file for the bi-level image 102, the routine 125 acquires and stores the quantized coefficients and quantization factors resulting from the compression of the bi-level image 102. In step 205, the routine 125 also converts the quantized coefficients from the JPEG data file to pixel intensities corresponding to the lower quality image 104. One skilled in JPEG compression will appreciate that the lower quality image 104 results from the process of decoding, dequantizing, and inverse transforming the quantized coefficients in the JPEG data file for the bi-level image 102. Because one skilled in JPEG compression would know the details surrounding this process, they have been omitted. The image reconstruction routine 125 stores the pixel intensities of the lower quality image 104, the quantization factors and quantized coefficients from the JPEG file for later use. These aid in producing the reconstructed image 127 of higher quality than the lower quality JPEG image 104.

Step 205 is followed by subroutine 210, in which the image reconstruction routine 125 makes the starting image data closer to bi-level by applying thresholding techniques. When step 205 precedes subroutine 210, the starting image is the lower quality image 104. Otherwise, the starting image is the reconstructed image 127. Generally, thresholding causes the pixel intensities to change their values. Because the JPEG image 104 may not be completely bi-level, the subroutine 210 increases the number of black and white pixels by forcing some gray pixels to become either black or white. Thresholding in subroutine 210 produces a threshold image with respective pixel intensities that are closer to bi-level when compared to the pixel intensities of the JPEG image 104. Subroutine 210 will be explained in greater detail with reference to FIGS. 3–10.

Subroutine 210 is followed by step 212, in which the routine 125 independently converts 8×8 blocks of the threshold image into transform coefficients representing decomposition of the threshold image. In transforming the threshold image, the routine 125 applies a DCT transform. As previously described, the DCT transform acts on the pixels in an 8×8 block by a corresponding basis function for each of the 8×8 blocks of an image. For the threshold image, this transform generates sixty-four transform, or DCT, coefficients for each of the 8×8 blocks of the threshold image.

Step 212 is followed by step 215, in which the routine 125 selectively clamps transform coefficients into appropriate quantization bins. As previously mentioned in reference to step 205, the routine 125 stored the quantization factors and quantized coefficients from the JPEG data file of the bi-level image 102. One skilled in JPEG compression will appreciate that within each 8×8 block of pixels, the corresponding sixty-four quantization factors relate to sixty-four frequencies. Because quantizing scales and rounds the DCT coefficients, the quantized coefficients from the bi-level image 102 lack the precision of the original DCT coefficients. Together the quantization factors and quantized coefficients define a midpoint and range to which the original DCT coefficients belonged, commonly referred to as a quantization bin. For example, the quantization bin can be calculated for a coefficient, C, with a quantization factor 32 and a quantized coefficient 1. The product of the quantization factor of 32 and quantized coefficient of 1 yields a midpoint 32. The quantization bin corresponds to the bin center of 32 plus or minus half of the quantization factor 32. Thus, the quantization bin ranges from 16 to 48.

In step 215, the routine 125 selectively clamps transform coefficients into the quantization bins defined by compression of the original bi-level image 102. The routine 125 calculates the quantization bins corresponding to the quantized coefficients and quantization factors. If some of the transform coefficients generated in step 212 lie outside of the corresponding quantization bin, the routine 125 forces those coefficients into the quantization bin by changing the values to the closest bin endpoint. Otherwise, the routine 125 does not adjust the values of the transform coefficients. For example, a quantization bin for a particular coefficient may include transform coefficients with values between sixteen and forty-eight. If a transform coefficient, C, has a value of less than sixteen, the routine 125 forces this coefficient into the quantization bin by changing the value to sixteen. If a transform coefficient C has a value of from sixteen to forty-eight, the routine 125 leaves the value unchanged. If a transform coefficient is greater than forty-eight, the transform coefficient is set to forty-eight. Thus, selective clamping generates modified coefficients by associating each transform coefficient with one of the pre-defined quantization bins. These modified coefficients correspond to the reconstructed image 127 as explained with reference to step 220.

In step 220, the routine 125 applies an inverse transform on the modified coefficients to generate the higher quality reconstructed image 127. Because one skilled in the art would be familiar with inverse transforms, the details surrounding inverse transforms were omitted. Typically, the image reconstruction routine 125 applies an inverse of the transform used in step 212, such as an inverse Discrete Cosine Transform.

In step 225, the image reconstruction routine 125 determines if the reconstructed image 127 generated in step 220 is the same as the starting image. In making this determination, the image reconstruction routine 125 analyzes corresponding intensities within identical blocks. For example, the sixty-four intensities corresponding to a block of the lower quality image 104 acquired in step 205 is compared to the sixty-four intensities generated in the same block of the reconstructed image 127 generated in step 220. The intensities for the starting image that represents the best reconstruction to date may be stored in a working buffer. If the reconstruction routine 125 determines the reconstructed image 127 differs from the starting image, it may replace the values in the working buffer with the values from the reconstructed image 127. Thus, the "NO" branch is followed from step 225 to step 230. One skilled in the art will appreciate that if these images are the same, the image reconstruction routine 125 cannot improve the image quality any further. Thus, "YES" branch is followed from step 225 to the "END" step 235.

In step 230, the image reconstruction routine 125 determines if the reconstructed image 127 is bi-level. In making this determination, the image reconstruction routine 125 assesses whether all the pixel intensities in the reconstructed image 127 correspond to an intensity of either a black or a white pixel. If the image reconstruction routine 125 determines that the reconstructed image 127 is not bi-level, the "NO" branch may be followed from step 230 to the subroutine 210. This "NO" branch provides a looping, or iterative, feature that improves the quality of the reconstructed image 127. If the reconstructed image 127 is bi-level, the "YES" branch is followed from step 230 to the "END" step 235. In following the "YES" branch, the routine 125 indicates that the reconstructed image 127 satisfies both the quantization bin condition and the bi-level condition.

Figure 3:
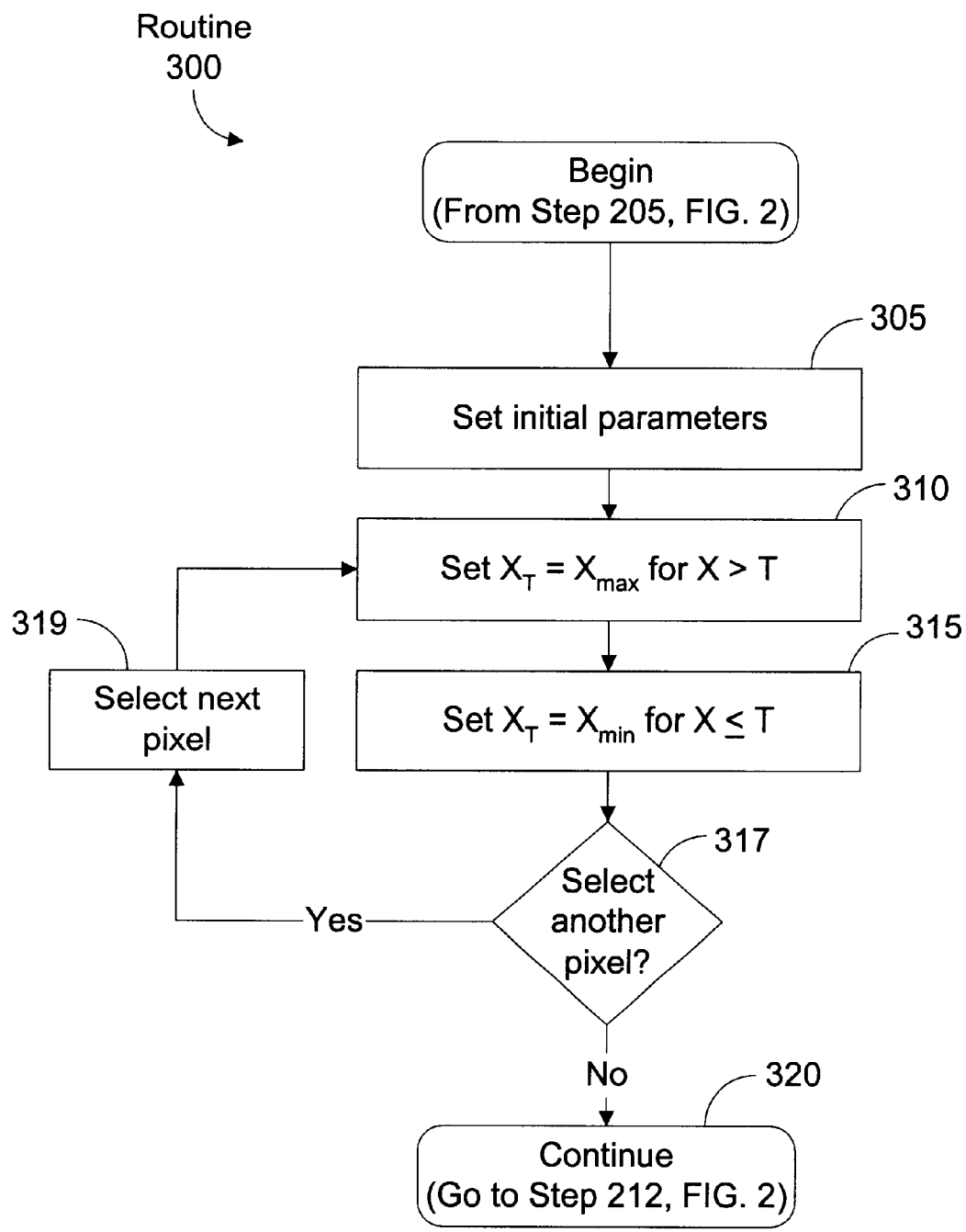
FIG. 3 is a logic flow diagram illustrating a first embodiment of a subroutine for the routine for applying threshold techniques shown in FIG. 2.

FIG. 3 is a logic flow diagram illustrating a routine 300 for a first embodiment of the subroutine 210. Routine 300 begins following step 205 shown in FIG. 2. In step 305, the routine 300 sets the initial parameters that govern how this routine executes. This step may define variables representing maximum intensity, minimum intensity, and a threshold. For example, X can represent the intensity of a pixel and $X_T$ the intensity after threshold. T may represent the threshold. In addition, $X_{max}$ may represent the intensity of a white pixel and $X_{min}$ the intensity of a black pixel. If routine 300 defines $X_{max}$ as 255 and $X_{min}$ as 0, the threshold T may be ½ $X_{max}$ or 127.5. Other initial parameters may include a maximum running time or maximum number of iterations.

Step 305 is followed by step 310, in which the routine 300 defines a first portion of the threshold intensities $X_T$ as $X_{max}$ for intensities greater than the threshold. As previously mentioned, pixels may be grouped in 8×8 blocks. Within an 8×8 block of pixels, the routine 300 uses step 310 to change each pixel with intensity X greater than the threshold T to an intensity of a white pixel $X_{max}$. Similarly, the routine 300 changes each pixel with intensity X less than or equal to the threshold T to an intensity of a black pixel $X_{min}$ in step 315. For a bi-level image, all of the intensities should equal either the intensity $X_{min}$ or the intensity $X_{max}$ because the only colors are black and white. Together, steps 310, 315 make the reconstructed, image 127 closer to bi-level using thresholding by forcing gray pixels to become either black or white.

Step 315 is followed by step 317, in which the routine 300 determines if another pixel should be selected. A criterion for making this determination may be counting the number of pixels that have been processed using steps 310, 315 and comparing that number to the total number of pixels in a given block. Because steps 310, 315 only alter the value of an individual pixel, they can be repeated for the remaining pixels in each 8×8 block. If steps 310, 315 were not applied to all pixels in a block, the "YES" branch is followed from step 317 to step 319. In step 319, the routine 300 selects the next pixel. Step 319 is followed by step 310, in which the routine 300 repeats the threshold techniques for this new pixel.

If all pixels in an 8×8 block were selected, the "NO" branch is followed from step 317 to the "CONTINUE" step 320. In step 320, the routine 300 returns to the step 212 shown in FIG. 2. After routine 300 executes and returns to step 212, the threshold intensities correspond to intensities of a completely black and white image, or threshold image. As previously mentioned, executing steps 212–220 may generate a reconstructed image 127 that differs from the starting image and is not bi-level. If so, the routine 125 repeats the threshold subroutine 210 as shown in FIG. 2. Consequently, the routine 300 may be repeated using the reconstructed image 127 as a starting image. To accomplish this, the image reconstruction routine 125 may replace the intensities in a working buffer containing the starting image with the intensities of the reconstructed image 127. Though this buffer update is not explicitly indicated in FIG. 2, this step could be added. Repeating the routine 300 generates a second reconstructed image with higher quality than the reconstructed image generated during the first iteration. In this manner, the reconstruction routine 125 continually improves the quality of the reconstructed image 127.

Figure 4:
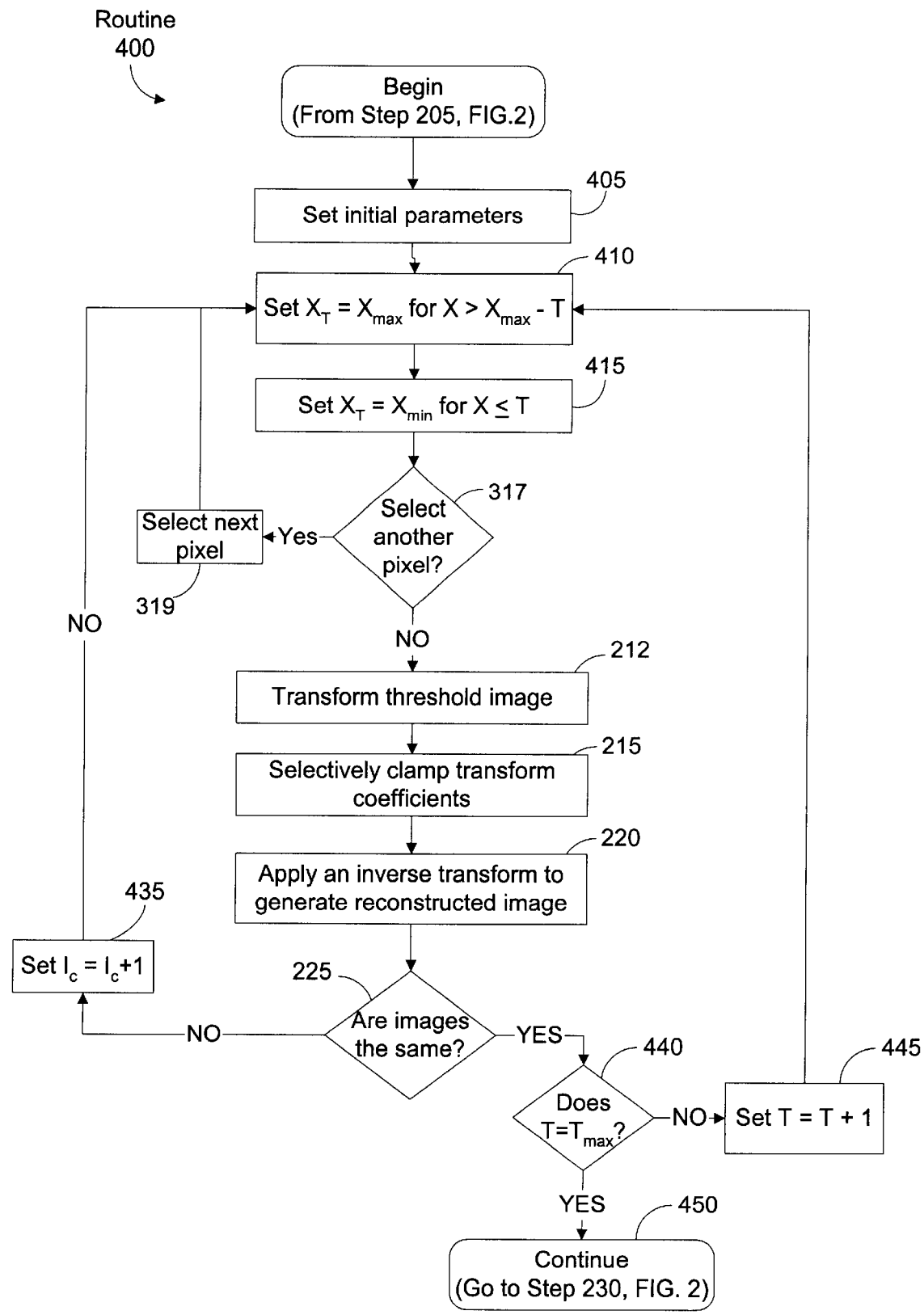
FIG. 4 is a logic flow diagram illustrating a second embodiment of a subroutine for the routine for applying threshold techniques shown in FIG. 2.

FIG. 4 is a logic flow diagram illustrating a routine 400 for a second embodiment of subroutine 210. This routine also begins from step 205 shown in FIG. 2. In step 405, the routine 400 sets initial parameters similar to step 305 shown in FIG. 3. In addition to the parameters previously described in reference to FIG. 3, additional parameters may include a maximum threshold $T_{max}$ and an iteration counter $I_c$. By utilizing the maximum threshold $T_{max}$ and the iteration counter $I_c$, the routine 400 can define conditions for actions. For example, the routine 400 could repeat for different values of the threshold T until a maximum threshold $T_{max}$ of 127.5 is reached.

Step 405 is followed by step 410, in which the routine 400 sets a portion of the threshold intensities $X_T$ to a maximum intensity $X_{max}$ for each pixel intensity X greater than ($X_{max}$−T) where T is the threshold. Step 410 is followed by step 415, in which the routine 400 sets another portion of the threshold intensities $X_T$ equivalent to a minimum intensity $X_{min}$ for each pixel intensity X less than or equal to the threshold T. Using steps 410, 415, the routine 400 can modify intensities close to $X_{max}$ and $X_{min}$, while leaving intensities in the middle unchanged. As the threshold T increases, the size of this "unchanged" region diminishes which changes more pixel intensities. As the routine 400 executes steps 410, 415, a closer to bi-level threshold image is produced.

Step 415 is followed by step 317, in which the routine 400 determines if another pixel should be selected. If so, the "YES" branch is followed from step 317 to step 319. Otherwise, the "NO" branch is followed from step 317 to step 212. Because steps 317, 319 were described with reference to FIG. 3, that description will not be repeated here.

If the "NO" branch is followed from step 317 to step 212, the routine 400 independently transforms the 8×8 blocks in the threshold image to generate transform coefficients. These transform coefficients represent the decomposition of the threshold image. Step 212 is followed by step 215, in which the routine 400 selectively clamps transform coefficients into quantization bins to generate modified coefficients. Step 215, is followed by step 220, in which the routine 400 applies an inverse transform on the modified coefficients to generate the higher quality reconstructed image 127. Because steps 212–215 were explained with reference to FIG. 2, further details will not be repeated here.

Step 220 is followed by step 225, in which the routine 400 determines if the reconstructed image 127 is the same as the starting by analyzing intensities as described with reference to FIG. 2. If these images differ, the routine 400 follows the "NO" branch from step 225 to step 435. In step 435, the routine 400 increments the iteration counter $I_c$ that monitors the number of iterations and returns to step 410. By returning to step 410, the routine 400 repeats so long as the reconstructed image 127 differs from the starting image. During iteration, the routine 400 uses the reconstructed image 127 as the starting image for the next iteration. Steps 225, 435 improve the quality of the reconstructed image 127 for a select threshold T. Alternatively, a maximum iteration count $I_{cmax}$ may be defined that limits the number of iterations for a select threshold T.

If the reconstructed image 127 is the same as the starting image, the "YES" branch is followed from step 225 to step 440. In step 440, the routine 400 determines if the current threshold T equals the maximum threshold $T_{max}$. This step defines a halting condition for the routine 400. If the current threshold T is unequal to the maximum threshold $T_{max}$, the "NO" branch is followed from step 440 to step 445. In step 445, the routine 400 increments the threshold T by one and then returns to step 410. By incrementing the threshold T, the routine 400 increases the number of bi-level pixels in the reconstructed image 127 by reducing the size of the "unchanged" region. Steps 440, 445 also iteratively improve the reconstructed image 127 by using it as the starting image for the next iteration cycle at the new threshold T+1. For this threshold, the routine 400 may execute several iterations, as previously described with reference to steps 225, 435. Together the steps 225, 435 and steps 440, 445 produce a reconstructed image 127 of higher quality than the lower quality image 104 by combining iterating at a threshold T with incrementing T.

If the threshold T equals the maximum threshold $T_{max}$, the "YES" branch is followed from step 440 to the "CONTINUE" step 450 which returns to step 230 shown on FIG. 2. Before executing the step 450, the routine 400 optimizes the reconstructed image 127 through multiple iterations and increments of the threshold T. Consequently, repeating routine 400 may not further improve the reconstructed image 127. If the reconstructed image 127 is not bi-level in step 230, the routine 125 may execute another embodiment of subroutine of 210, such as routine 300 instead of routine 400.

Figure 5:
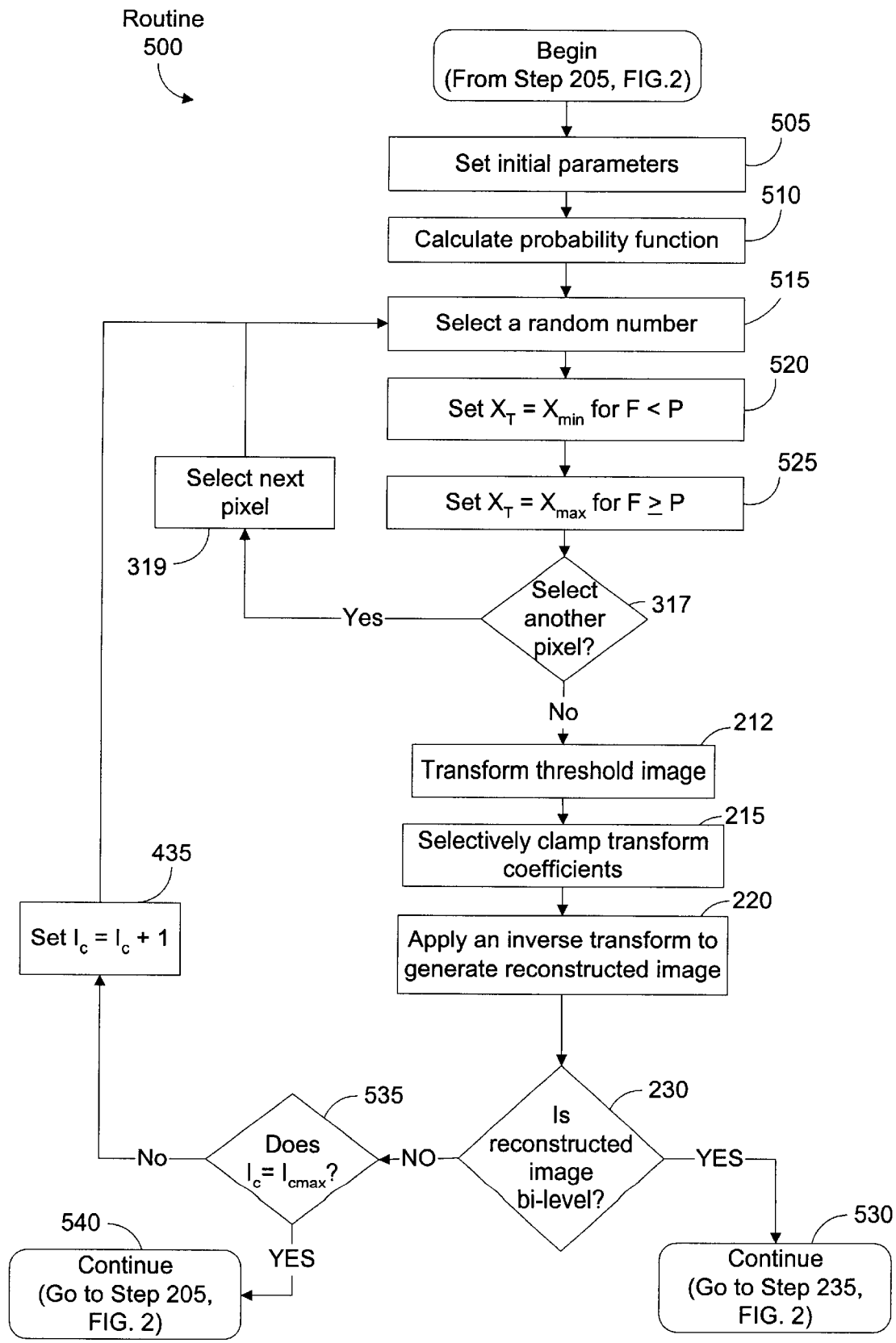
FIG. 5 is a logic flow diagram illustrating a third embodiment of a subroutine for the routine for applying threshold techniques shown in FIG. 2.

FIG. 5 is a logic flow diagram illustrating a routine 500 for a third embodiment of subroutine 210. As with the previous embodiments, the routine 500 begins from step 205 shown in FIG. 2. In step 505, the routine 500 sets initial parameters similar to the step 405 shown in FIG. 4. In addition to the previously mentioned parameters, the routine 500 defines a maximum number of iterations $I_{cmax}$. By using $I_{cmax}$, the routine 500 may limit the number of iterations to four, for example. Instead of setting a threshold T, the routine 500 defines a probability function F for varying pixel intensities X. This function specifies the probability that the intensity X will be threshold to the value $X_{max}$.

For intensities X less than $\frac{1}{2}(X_{min}+X_{max})$, the probability function F may equal $\frac{1}{2}(2(X-X_{min})/(X_{max}-X_{min}))^e$. For intensities X greater than $\frac{1}{2}(X_{min}+X_{max})$, the probability function F may equal $1-\frac{1}{2}(2(X_{max}-X)/(X_{max}-X_{min}))^e$. The routine 500 may select a constant for e, such as a value between 1.0 and 1.5. Though the previously defined probability function F may be used, alternative functions may be used as well. Specifically, any function with a probability of zero for an intensity X of $X_{min}$, a probability of one for an intensity X of $X_{max}$, and an increasing nature may be used. For example, the probability function may equal $(X-X_{min})/(X_{max}-X_{min})$.

Step 505 is followed by step 510, in which the routine 500 generates a table of values of the probability function F by calculating this function for all possible intensities X. Calculating these probabilities and storing them in a table enhances processing speed. Though the routine 500 may enhance speed by using step 510, this step may be omitted. Step 510 is followed by step 515, in which the routine 500 chooses a random number P for each pixel in an 8×8 block of pixels. Typically, the random number P is a number uniformly distributed between zero and one. In selecting the random number P, the routine 500 may utilize a random number generator.

Step 515 is followed by step 520, in which the routine 500 sets the threshold intensities $X_T$ equal to a minimum intensity $X_{min}$ for each pixel with a corresponding random number P greater than the value of the probability function F. Because the probability function F was previously computed, the routine can retrieve the appropriate probability and compare it to the random number P. Step 520 is followed by step 525, in which the routine 500 sets the threshold intensities $X_T$ equal to a maximum value $X_{max}$ for each pixel with a corresponding random number P less than the value of the probability function F. With steps 520, 525, the routine 500 effectively assigns threshold intensities corresponding to a threshold image by using the probabilities. These probabilities account for both the pixel intensity X and the probability that it may be threshold to an incorrect value.

Step 525 is followed by step 317, in which the routine 500 determines if another pixel should be selected. As previously mentioned, the routine may consider the number of pixels in an 8×8 block when making this determination. If desired, the "YES" branch is followed from step 317 to step 319. Instep 319, the routine 500 selects the next pixel and returns to step 515. As previously mentioned with reference to FIG. 3, the routine 500 uses steps 317, 319 to separately threshold each pixel in an 8×8 block of pixels.

If the "NO" branch is followed from step 317 to step 212, the routine 500 transforms the threshold image to generate transform coefficients. These coefficients correspond to the decomposition of the threshold image. Step 212 is followed by step 215, in which the routine 500 selectively clamps a portion of the transform coefficients into quantization bins. This selective clamping generates modified coefficients. Step 215 is followed by step 220, in which routine 500 applies an inverse transform on the modified coefficients. Because steps 212–220 were explained with reference to FIG. 2, additional details for these steps will not be repeated here.

Step 220 is followed by step 230, in which, the routine 500 determines if the reconstructed image 127 is bi-level. If this image is bi-level, the "YES" branch is followed from step 230 to the "CONTINUE" step 530. In step 530, the routine 500 returns to the "END" step 235 shown on FIG. 2. Consequently, the image reconstruction routine 125 halts, as previously described, because the reconstructed image satisfied both the bi-level and quantization bin conditions.

If the "NO" branch is followed from step 230 to step 535, the routine 500 determines if the iteration counter $I_c$ reached its maximum value $I_{cmax}$. The routine 500 monitors the settling time, length of time needed for convergence, by executing step 535. If the iteration counter $I_c$ is unequal to $I_{cmax}$, the routine 500 follows the "NO" branch from step 535 to step 435. In step 435, the routine 500 increments the iteration counter $I_c$ by one and returns to step 515. By returning to this step, the routine 500 can complete another iteration with the same threshold intensities $X_T$.

If the iteration counter $I_c$ is equal to $I_{cmax}$, the "YES" branch is followed from step 535 to the "CONTINUE" step 540. In step 540, the routine 500 returns to the step 205 shown on FIG. 2. In this step, the image reconstruction routine 125 acquires image data. Because the next step after step 205 is subroutine 210 of which routine 500 is an embodiment, the routine 500 can reset the data before the next set of iterations by using the "CONTINUE" step 540. To accomplish this, the routine 125 may use buffers as previously described. Resetting restarts the routine 500 and avoids extended "run" times by restoring pixel intensities for the lower quality image 104.

Figure 6:
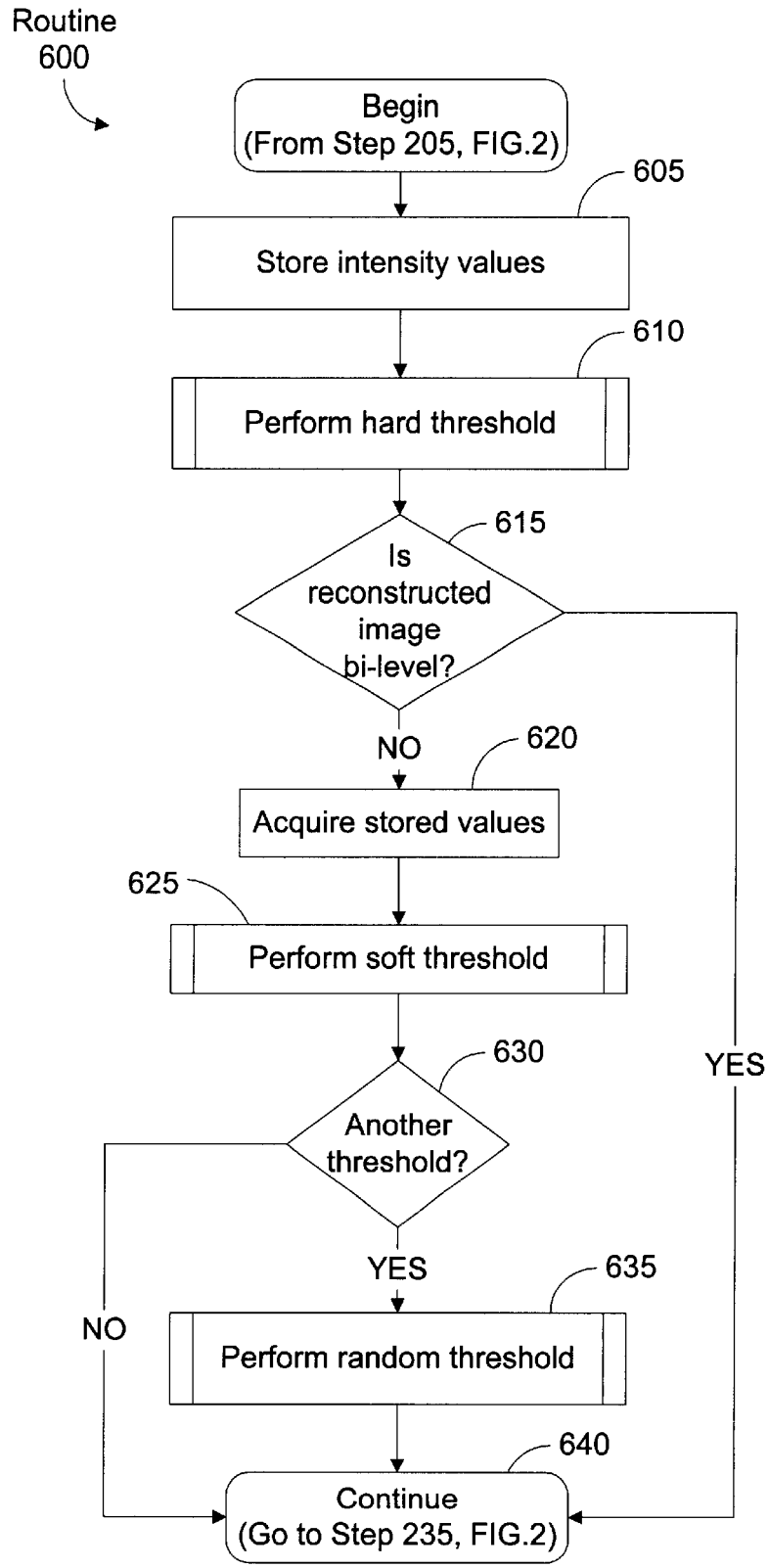
FIG. 6 is a logic flow diagram illustrating a fourth embodiment of a subroutine for the routine for applying threshold techniques shown in FIG. 2 using a combined algorithm.

FIG. 6 is a logic flow diagram illustrating a routine 600 for a fourth embodiment of the subroutine 210 using a combined algorithm. In step 605, the routine 600 stores intensities X for the starting image in a location that makes them accessible for future use. Step 605 is followed by routine 610, in which the routine 600 alters the pixel intensities by performing a hard threshold that is explained in more detail with reference to FIG. 8. Routine 610 is followed by step 615, in which the routine 600 determines if the reconstructed image 127 is bi-level. Because the hard threshold in routine 610 includes a transform step 212, it can result in non bi-level intensities that correspond to gray pixels. In step 615, the routine 600 determines if the reconstructed image 127 remained bi-level after this transform. If this image is bi-level, the routine 600 follows the "YES" branch to the "CONTINUE" step 640 and ends the processing on the corresponding 8×8 block of pixels.

If the reconstructed image 127 is not bi-level, the "NO" branch is followed from step 615 to step 620. In step 620, the routine 600 acquires the stored intensities for the starting image. Typically, the routine 600 acquires this data from the location discussed in reference to step 605. In this manner, the routine 600 restores the original values for the lower quality image 104 before performing another type of thresholding. Alternatively, the routine 600 may acquire the pixel intensities of the reconstructed image 127 in step 620.

Step 620 is followed by the routine 625, in which the routine 600 performs a soft threshold, which is explained in detail with reference to FIG. 9. Routine 625 is followed by step 630, in which the routine 600 determines whether to threshold the data again. In making this determination, the routine 600 may consider if the reconstructed image 127 is bi-level image or the amount of time expended, for example. If another threshold is desired, the "YES" branch is followed from step 630 to routine 635. In routine 635, the routine 600 performs a random as explained in detail with reference to FIG. 10. Routine 635 is followed by the "CONTINUE" step 640, in which the routine 600 returns to the "END" step 235 shown on FIG. 2. If another threshold is not desired, the "NO" branch is followed from the step 630 to the "CONTINUE" step 640.

Figure 7:
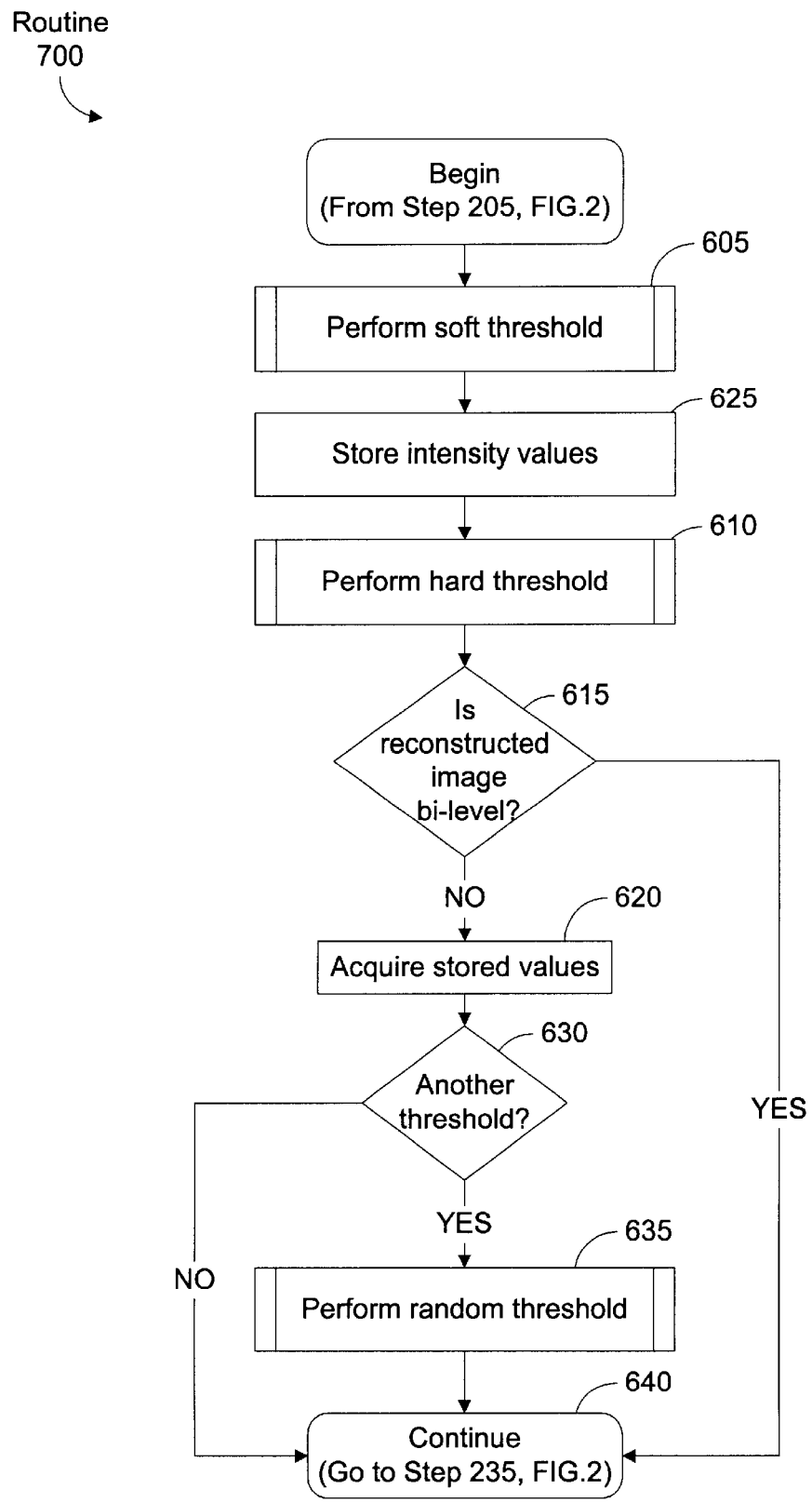
FIG. 7 is a logic flow diagram illustrating a fifth embodiment of a subroutine for the routine for applying threshold techniques shown in FIG. 2 using a combined algorithm.

The routine 600 demonstrates an embodiment of the subroutine 210 using a combined algorithm that sequentially processes image data using at least two threshold techniques with an option to use a third. While routine 600 completes the hard threshold routine 610 before the soft threshold routine 625, FIG. 7 is a logic flow diagram illustrating a routine 700 that completes the soft threshold routine 625 before the hard threshold routine 610. One skilled in the art will appreciate that the routine 700 is substantially similar to routine 600 shown in FIG. 6 and demonstrates an alternative embodiment of the subroutine 210 using a combined algorithm. Though not shown, another alternative embodiment of the routine 600 may include sequentially completing the random threshold routine 635 followed by either the soft threshold routine 625 or the hard threshold routine 610.

Figure 8:
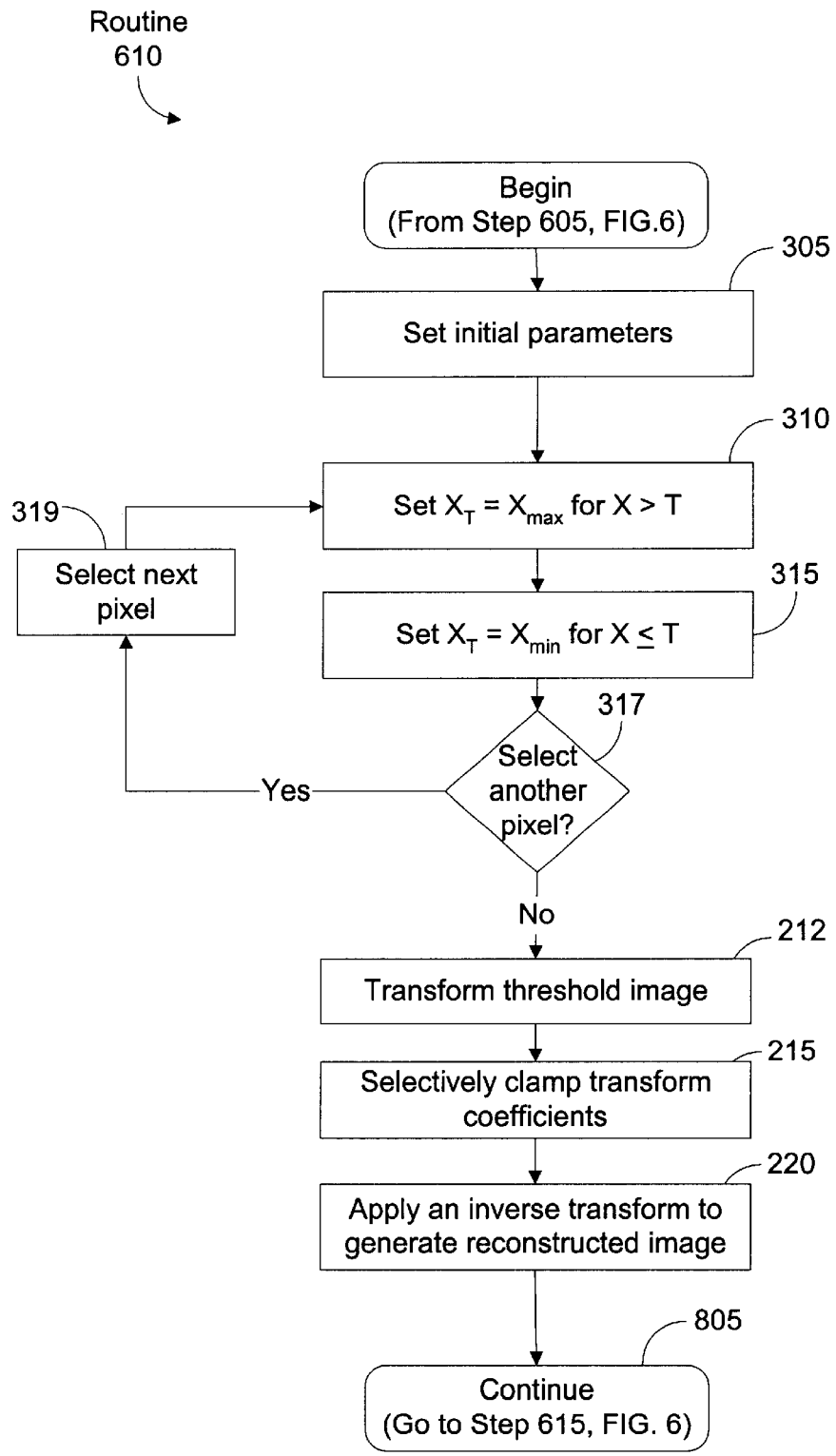
FIG. 8 is a logic flow diagram illustrating a subroutine the routine for applying a hard threshold shown in FIG. 6.

FIG. 8 is a logic flow diagram illustrating the hard threshold routine 610 shown in FIG. 6. Routine 610 begins from step 605 shown in FIG. 6. In step 305, the hard threshold routine 610 sets initial parameters as described with reference to FIG. 3. Step 305 is followed by step 310, in which the hard threshold routine 610 sets some of the threshold intensities $X_T$ equivalent to a maximum value $X_{max}$ for intensities greater than the threshold T. Step 310 is followed by step 315, in which the hard threshold routine 610 sets the remainder of the threshold intensities $X_T$ to a minimum value $X_{min}$ for intensities less than or equal to the threshold T. Step 315 is followed by step 317, in which the hard threshold routine 610 determines if another pixel should be selected. If so, the "YES" branch is followed from step 317 to step 319. Otherwise, the "NO" branch is followed from step 317 to step 212. For the sake of brevity, the looping feature previously described with reference to steps 317, 319 shown on FIG. 3 will not be repeated.

In step 212, the hard threshold routine 610 transforms the threshold image. Step 212 is followed by step 215, in which the hard threshold routine 610 selectively clamps transform coefficients to quantization bins. Step 215 is followed by step 220, in which the routine 610 applies an inverse transform on the modified coefficients to generate the reconstructed image 127. Steps 212–220 were described with reference to FIG. 2 and that explanation will not be repeated here. Step 220 is followed by the "CONTINUE" step 805, in which the hard threshold routine 610 returns to step 615 shown in FIG. 6. One skilled in the art will appreciate that the hard threshold routine 610 of the combined algorithm embodied in routine 600 functions similarly to the routine 300 shown in FIG. 3. Yet, the routine 600 completes only a single iteration for each 8×8 block of pixels.

Figure 9:
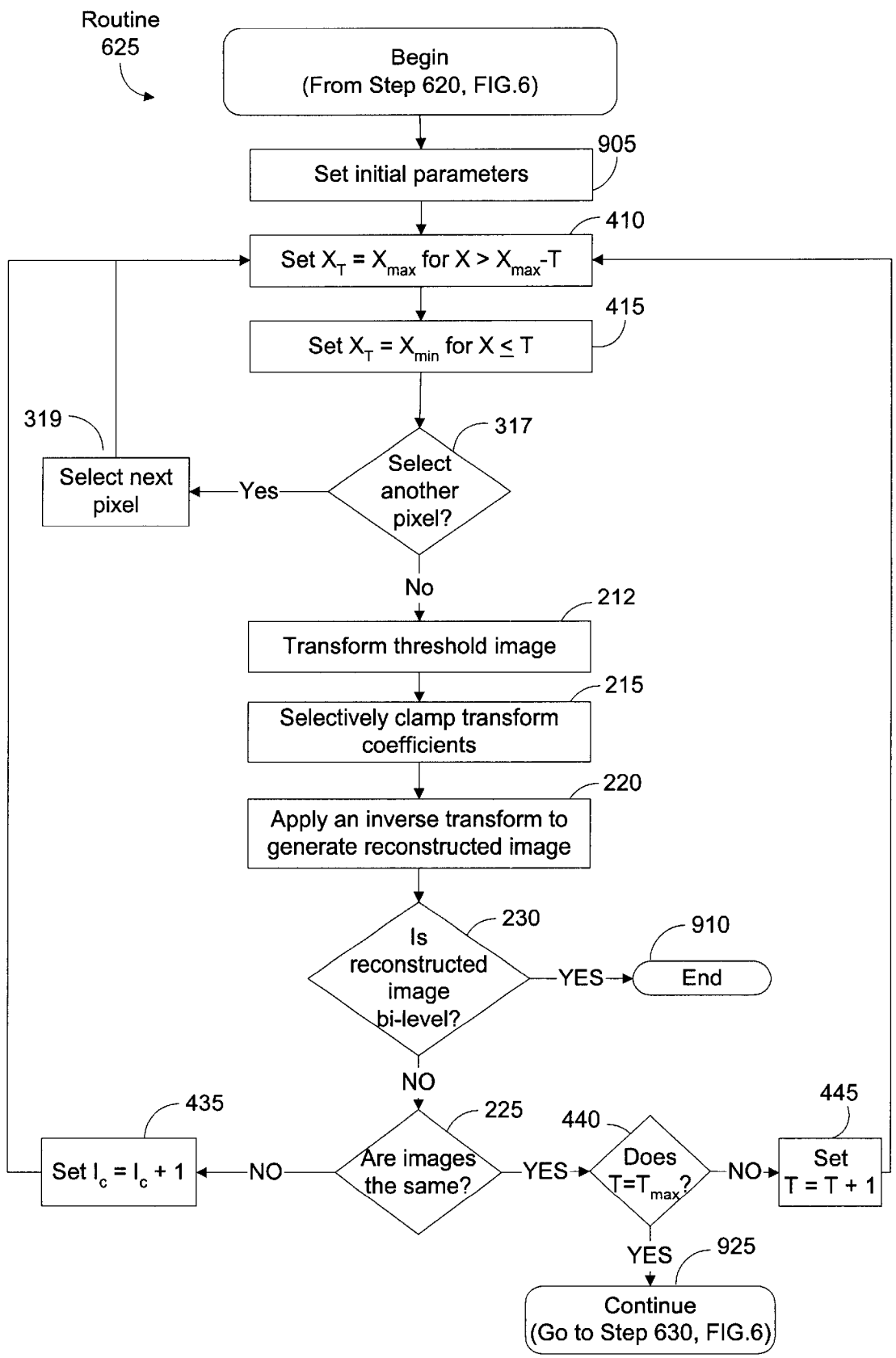
FIG. 9 is a logic flow diagram illustrating the routine for applying a soft threshold shown in FIG. 6.

FIG. 9 is a logic flow diagram illustrating the soft threshold routine 625 shown on FIG. 6. This routine begins from step 620 shown on FIG. 6. In step 905, the soft threshold routine 625 sets initial parameters similar to step 405 shown on FIG. 4. In contrast, the routine 625 may set the threshold maximum $T_{max}$ in this step smaller than the threshold maximum $T_{max}$ set in step 405. For example, when using a single threshold technique as illustrated in routine 400 of FIG. 4, the threshold maximum $T_{max}$ may be 127. Yet, the routine 625 may set the threshold maximum $T_{max}$ at 51 since routine 600 uses a soft threshold routine 625 in combination with other thresholding techniques as illustrated in FIG. 6. In this example, the routine 400 "runs" to full completion, while the routine 625 does not.

Step 905 is followed by step 410, in which the soft threshold routine 625 sets some of the threshold intensities $X_T$ equal to a maximum value $X_{max}$ for intensities greater than the maximum value $X_{max}$ minus the threshold T as described with reference to FIG. 4. Step 410 is followed by step 415, in which the soft threshold routine 625 sets threshold intensities $X_T$ equal to a minimum value $X_{min}$ for intensities less than or equal to the threshold T. Step 415 is followed by step 317, in which the soft threshold routine 625 determines if another pixel should be selected. If so, the "YES" branch is followed from step 317 to step 319. Otherwise, the "NO" branch is followed from step 317 to step 212. Because steps 317, 319 were previously described with reference to FIG. 3, that explanation will not be repeated here.

In step 212, the routine 625 transforms the threshold image. Step 212 is followed by step 215, in which the soft threshold routine 625 selectively clamps transform coefficients to quantization bins. Step 215 is followed by step 220, in which the soft threshold routine 625 applies an inverse transform to generate the reconstructed image 127. For additional details regarding steps 212–220, the reader is referred to their description in reference to FIG. 2. Step 220 is followed by step 230, in which the routine 625 determines if the reconstructed image 127 is bi-level. If this image 127 is bi-level, the routine 625 follows the "YES" branch from step 230 to the "END" step 910. In step 910, the routine 625 ends because the reconstructed image 127 satisfies the quantization bin and the bi-level objectives. Hence, it effectively reflects the original bi-level image 112.

If the reconstructed image 127 is not bi-level, the routine 625 follows the "NO" branch from step 230 to step 225. In step 225, the soft threshold routine 625 determines if the reconstructed image 127 is the same as the starting image as described with reference to FIG. 2. As previously mentioned, this determination may be made by simply analyzing the respective intensities among these images. For routine 625, the starting image could be the reconstructed image from the hard threshold routine 605.

If the "NO" branch is followed from step 225 to step 435, the routine 625 increments the iteration counter $I_c$ by one as described with reference to FIG. 4. Step 435 is followed by step 410, in which the routine 625 returns to step 410 and begins another iteration. If the reconstructed image 127 is the same as the starting image, the routine 625 follows the "YES" branch from step 225 to step 440. In step 440, the routine 625 determines whether the threshold T has reached the threshold maximum $T_{max}$ as described with reference to FIG. 4. If the threshold T equals the threshold maximum $T_{max}$, the "YES" branch is followed from step 440 to the "CONTINUE" step 925. In step 925, the routine 625 returns to step 630 shown in FIG. 6. If the threshold T is unequal to $T_{max}$, the routine 625 follows the "NO" branch from step 440 to step 445 where it increments the threshold T by one. After step 445, the routine 625 returns to step 410 where it repeats the process with a larger threshold T. One skilled in the art will appreciate that the routine 625 functions similarly to routine 400 with fewer iterations because of the reduced threshold maximum $T_{max}$.

Figure 10:
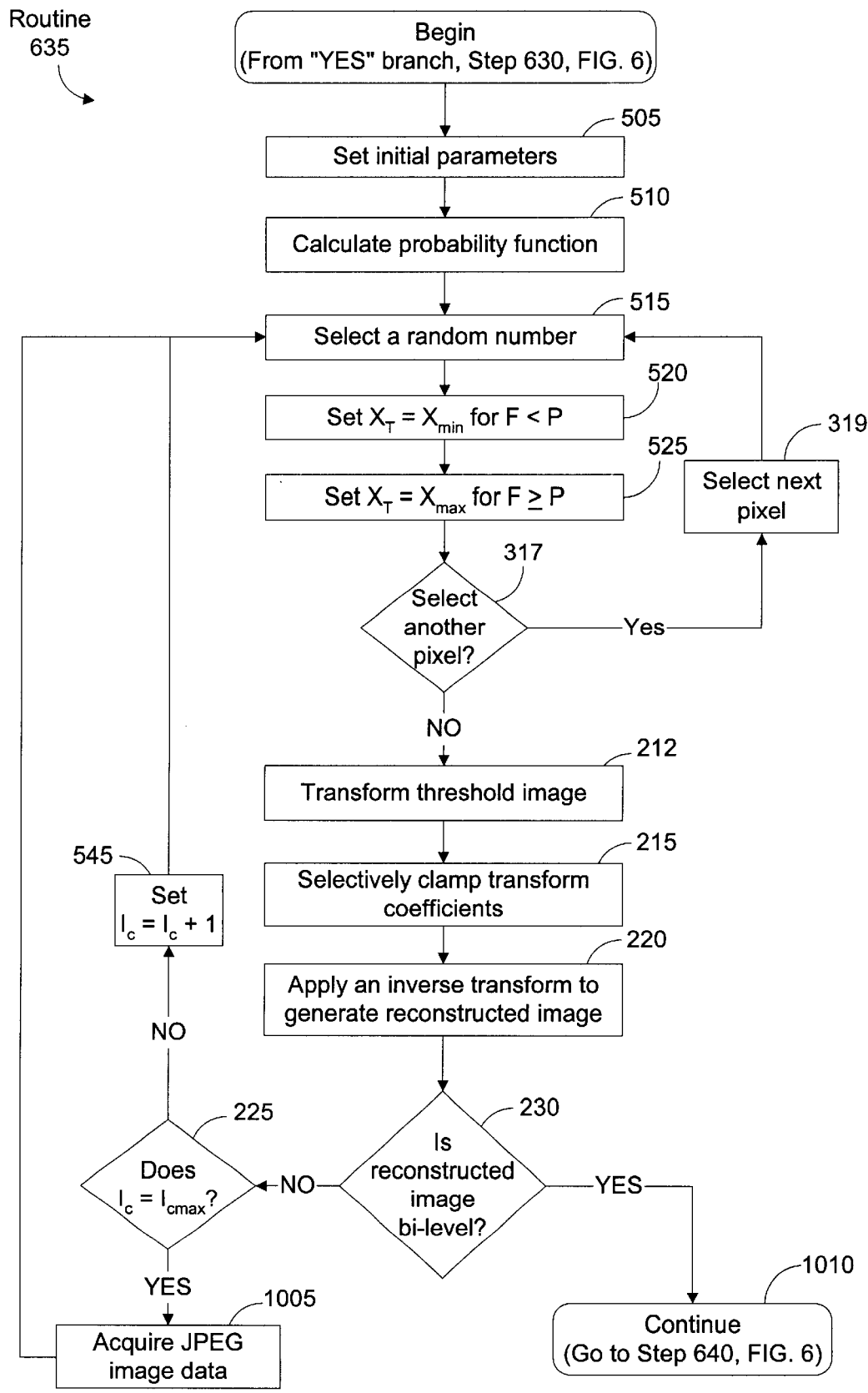
FIG. 10 is a logic flow diagram illustrating the routine for applying a random threshold shown in FIG. 6.

FIG. 10 is a logic flow diagram illustrating the random threshold routine 635, as shown on FIG. 6. Routine 635 begins from the "YES" branch of step 630 shown in FIG. 6. In step 505, the random threshold routine 635 sets initial parameters as described in reference to FIG. 5. Step 505 is followed by step 510, in which the random threshold routine 635 computes the probability function F defined in step 505 for all intensities X and places the results in a table. Step 510 is followed by step 515, in which the random threshold routine 635 selects a random number P for each pixel between 0 and 1 as described with reference to FIG. 5. Step 515 is followed by step 520, in which the routine 635 sets some threshold intensities $X_T$ equivalent to a minimum value $X_{min}$ for pixels with respective random numbers P greater than the corresponding value of the probability function F. Step 520 is followed by step 525, in which the random threshold routine 635 sets the remainder of the threshold intensities $X_T$ equivalent to a maximum value $X_{max}$ for pixels with random numbers less than the corresponding value of the probability function. For the sake of brevity, the details regarding steps 515–525 will not be repeated since they were discussed with reference to FIG. 5.

Step 525 is followed by step 317, in which the routine 500 determines if another pixel should be selected. If so, the "YES" branch is followed to step 319. Otherwise, the "NO" branch is followed to step 420. As previously mentioned, steps 317, 319 aid in applying the threshold technique to each pixel in an 8×8 block of pixels. If the "NO" branch is followed from step 317 to step 212, the routine 635 transforms the threshold image. Step 212 is followed by step 215, in which the routine 635 selectively clamps threshold coefficients. Step 215 is followed by step 220, in which the routine 635 applies an inverse transform on the modified coefficients to generate the reconstructed image 127. For the sake of brevity, the details regarding previously mentioned steps are not be repeated.

Step 220 is followed by step 230, in which the random threshold routine 635 determines if the reconstructed image 127 is bi-level. If this image is bi-level, the "YES" branch is followed from step 230 to the "CONTINUE" step 1010. In step 1010, the routine 635 returns to the "CONTINUE" step 640 shown in FIG. 6. If the "NO" branch is followed from step 230 to step 225, the routine 635 assesses if the iteration counter $I_c$ reached the maximum number of iterations $I_{cmax}$ as described with reference to FIG. 5. If the "NO" branch is followed from step 225 to step 545, the routine 635 increments the iteration counter $I_c$ by one as described with reference to FIG. 5. Step 545 is followed by step 515, in which the routine 635 begins another iteration. If the iteration counter $I_c$ reached the maximum, the "YES" branch is followed from step 225 to step 1005. In step 1005, the routine 635 acquires JPEG image data and later returns to step 515. The routine 635 resets the data-using step 1005 before beginning another set of iterations as described with reference to FIG. 5.

When integrated in software, the invented method and system provides end-users with a higher quality reconstructed JPEG image. Because the image reconstruction routine 125 independently processes blocks of pixels, poor areas of the lower quality image may be improved without adversely affecting the remaining areas. For example, this routine can improve text portions of the low quality JPEG image that contain "smudges" without adversely impacting the graphic portion of the image. Thus, the invention revolutionizes gee reconstruction of lower quality JPEG images in the absence of the original bi-level image.

It will be appreciated by those of ordinary skill in the art having the benefit of this disclosure that numerous variations from the foregoing illustration will be possible without departing from the inventive concepts described therein. Accordingly, it is the claims set forth below, and not merely the foregoing illustration, which are intended to define the exclusive rights of the invention.

The invention claimed is:

1. A method for generating a higher quality reconstructed image from a starting image resulting from a compressed representation of a bi-level image, comprising the steps of:

decompressing the compressed representation to produce the staring image;

thresholding to force pixels of the starting image to be closer to bi-level to generate a threshold image;

transforming the threshold image to generate transform coefficients representing decomposition of the threshold image;

selectively clamping a portion of the transform coefficients into quantization bins defined by compression of the bi-level image, the selective clamping generating modified coefficients corresponding to the higher quality reconstructed image; and applying an inverse transform on the modified coefficients to generate the higher quality reconstructed image, the thresholding comprising the substeps of:

selecting a random number between zero and one for each of the pixels;

defining a probability function that specifies the probability that each pixel of the staring image will be forced to be a first color;

setting a first portion of the pixels to the first color if the probability function for each of the pixels in the first portion of pixels is not less than the corresponding random number; and setting remaining pixels to a second color if the probability function for each of the remaining pixels is not less than the random number.

2. The method of claim 1 wherein thresholding further comprises the steps of:

forcing a first portion of the pixels to be a first color for corresponding intensities that are not more than a first threshold; and forcing the remaining pixels to be a second color for corresponding intensities that are more than a second threshold.

3. The method of claim 2 wherein the first color is black and the second color is white.

4. The method of claim 1 wherein defining the probability function includes defining a probability function $F=\frac{1}{2}(2X/255)^e$ for pixels less than a third number, where X represents a pixel and e equals 1.5.

5. The method of claim 4 wherein defining the probability function includes defining a probability function $F=1-\frac{1}{2}(2(255-X)/255)^e$ for pixels more than the third number, where X represents a pixel and e equals 1.5.

6. The method of claim 1 wherein transforming the threshold image includes applying a DCT transform on the threshold image.

7. The method of claim 1 wherein transforming the threshold image includes applying a DCT transform.

8. The method of claim 1 wherein applying an inverse transform includes applying an inverse DCT transform.

9. The method of claim 1 further comprising iteratively improving the reconstructed image by repeating at least two steps.

10. A method for generating a higher quality reconstructed image from a starting JPEG image resulting from a compressed representation of a bi-level image, comprising the steps of:

thresholding a first portion of the pixels of the starting image to be a first color if the corresponding intensities are not more than a first threshold;

thresholding remaining pixels of the starting image to be a second color if the corresponding intensities are more than a second threshold, the thresholding of the pixels generating a threshold image;

transforming the threshold image to generate transform coefficients representing decomposition of the threshold image;

selectively clamping a portion of the transform coefficients into quantization bins defined by compression of the bi-level image, the selective clamping generating modified coefficients corresponding to the higher quality reconstructed image; and applying an inverse transform on the modified coefficients to generate the higher quality reconstructed image, the thresholding comprising the substeps of:

selecting a random number between zero and one for each of the pixels;

defining a probability function that specifies the probability that each pixel will be forced to be a first color;

setting a first portion of the pixels to the first color if the probability function for each of the pixels in the first portion of pixels is not less than the corresponding random number; and setting remaining pixels to a second color if the probability function for each of the remaining pixels is not less than the random number.

11. The method of claim 10 further comprising the steps of:

thresholding to force pixels of the reconstructed image to be closer to bi-level to generate a second threshold image;

transforming the second threshold image to generate a second set of transform coefficients representing decomposition of the second threshold image;

selectively clamping a portion of the second set of transform coefficients into the quantization bins defined by compression of the reconstructed image, the selective clamping generating a second set of modified coefficients corresponding to a second higher quality reconstructed image; and applying an inverse transform on the second set of modified coefficients to generate the second higher quality reconstructed image.

12. The method of claim 10 wherein transforming the threshold image includes applying a DCT transform.

13. The method of claim 10 wherein the first color equals black and the second color equals white.

14. A method for generating a higher quality reconstructed image from a starting JPEG image resulting from a compressed representation of a bi-level image, comprising the steps of:

selecting a random number between zero and one for each of the pixels;

defining a probability function that specifies the probability that each pixel of the starting image will not be forced to be a first color;

thresholding a first portion of the pixels to a first color if the probability function for each of the pixels in the first portion of pixels is less than the corresponding random number;

thresholding the remaining pixels to a second color if the probability function for remaining pixels is less than the corresponding random number, the thresholding of pixels generating a threshold image;

transforming the threshold image to generate transform coefficients representing decomposition of the threshold image;

selectively clamping a portion of the transform coefficients into quantization bins defined by compression of the bi-level image, the selective clamping generating modified coefficients corresponding to the higher quality reconstructed image; and applying an inverse transform on the modified coefficients to generate the higher quality reconstructed image.

15. The method of claim 14 wherein defining the probability function includes defining a probability function $F=\frac{1}{2}(2X/255)^e$ for pixels less than a third number, where X represents a pixel and e represents a predefined constant.

16. The method of claim 14 wherein defining the probability function includes defining a probability function $F=1-\frac{1}{2}(2(255-X)/255)^e$ for pixels more than the third number, where X represents a pixel and e represents a predefined constant.

17. The method of claim 14 wherein the first color equals black and the second color equals white.

18. The method of claim 14 wherein applying an inverse includes applying a DCT transform.

19. In a computer system, an image reconstruction system configured to implement a method for generating a higher quality reconstructed image from a starting JPEG image resulting from a compressed representation of a bi-level image, comprising the steps of:

thresholding to force pixels of the starting image to be closer to bi-level to generate a threshold image;

transforming the threshold image to generate transform coefficients representing decomposition of the threshold image;

selectively clamping a portion of the transform coefficients into quantization bins defined by compression of the bi-level image, the selective clamping generating modified coefficients corresponding to the higher quality reconstructed image; and applying an inverse transform on the modified coefficients to generate the higher quality reconstructed image, the thresholding further comprising the substeps of:

selecting a random number between zero and one for each of the pixels;

defining a probability function that specifies the probability that each pixel of the stating image will be forced to be a first color;

setting a first portion of the pixels to the first color if the probability function for each of the pixels in the fist portion of pixels is not less than the corresponding random number; and setting remaining pixels to a second color if the probability function for each of the remaining pixels is not less than the random number.

20. The method of claim 19 wherein thresholding further comprises the steps of:

forcing a first portion of the pixels to be a first color for corresponding intensities that are not more than a first threshold; and forcing the remaining pixels to be a second color for corresponding intensities that are more than a second threshold.

21. The method of claim 19 wherein the first color equals black and the second color equals white.

22. The method of claim 10 further comprising iteratively improving the reconstructed image by repeating the thresholding of a first portion of the pixels and the thresholding of remaining pixels, wherein the first and second thresholds are incremented during each iteration.

23. The method of claim 22 wherein incrementing the first and second thresholds cause the first and second thresholds to approach a value of 127.5.

24. The method of claim 22 wherein iteratively improving is stopped if the reconstructed image and the starting image are the same.

25. A method for generating a higher quality reconstructed image from a starting JPEG image resulting from a compressed representation of a bi-level image, comprising the steps of:

- thresholding a first portion of the pixels of the starting image to be a first color if the corresponding intensities are not more than a first threshold;
- thresholding remaining pixels of the starting image to be a second color if the corresponding intensities are more than a second threshold, the thresholding of the pixels generating a threshold image;
- transforming the threshold image to generate transform coefficients representing decomposition of the threshold image;
- selectively clamping a portion of the transform coefficients into quantization bins defined by compression of the bi-level image, the selective clamping generating a first set of modified coefficients corresponding to a first intermediate reconstructed image; and
- applying an inverse transform on the first set of modified coefficients to generate the first intermediate reconstructed image;
- thresholding a first portion of the pixels of the first intermediate reconstructed image to be a first color if the corresponding intensities are not more than a first threshold;
- thresholding remaining pixels of the first intermediate reconstructed image to be a second color if the corresponding intensities are more than a second threshold, the thresholding of the pixels generating a second threshold image;
- transforming the second threshold image to generate a second set of transform coefficients representing decomposition of the threshold image;
- selectively clamping a portion of the second set of transform coefficients into quantization bins defined by compression of the bi-level image, the selective clamping generating a second set of modified coefficients corresponding to a second intermediate reconstructed image; and
- applying an inverse transform on the second set of modified coefficients to generate the second intermediate reconstructed image;
- selecting a random number between zero and one for each of the pixels in the second intermediate reconstructed image;
- defining a probability function that specifies the probability that each pixel of the second intermediate reconstructed image will not be forced to be a first color;
- thresholding a first portion of the pixels to a first color if the probability function for each of the pixels in the first portion of pixels is less than the corresponding random number;
- thresholding the remaining pixels to a second color if the probability function for remaining pixels is less than the corresponding random number, the thresholding of pixels generating a third threshold image;
- transforming the third threshold image to generate a third set of transform coefficients representing decomposition of the threshold image;
- selectively clamping a portion of the third set of transform coefficients into quantization bins defined by compression of the bi-level image, the selective clamping generating a third set of modified coefficients corresponding to the higher quality reconstructed image; and
- applying an inverse transform on the third set of modified coefficients to generate the higher quality reconstructed image.

* * * * *